United States Patent

[11] 3,626,219

[72] Inventor Leon R. Lease
708 Bellwood Drive, Mankato, Minn. 56001
[21] Appl. No. 39,443
[22] Filed May 21, 1970
[45] Patented Dec. 7, 1971

[54] DYNAMO ELECTRIC MACHINE AND METHOD OF MAKING SAME
19 Claims, 10 Drawing Figs.

[52] U.S. Cl................................................ 310/42, 310/218, 310/258
[51] Int. Cl........................................................ H02k 15/02
[50] Field of Search............................................ 310/42, 218, 254, 259, 258

[56] References Cited
UNITED STATES PATENTS
2,982,873 5/1961 Simmons et al............... 310/258

*Primary Examiner*—D. X. Sliney
*Attorney*—Burd, Braddock & Bartz

ABSTRACT: Generators and motors whose housings are formed economically from readily available structural iron. The housings for two-pole units are made from segments of structural channel iron or cold rolled flats. The housings for four-pole units are made from segments of structural angle iron or cold rolled flats. The pole assemblies are precisely positioned by means of an appropriate jig. While the pole assemblies are so positioned, the structural iron members are wedged or otherwise disposed against the pole assemblies and secured, as by welding, to maintain the precise spatial relationships. The units are completed by end plates in which an armature structure is journaled. The housings are formed with a minimum of labor and a minimum of precision metal working operations.

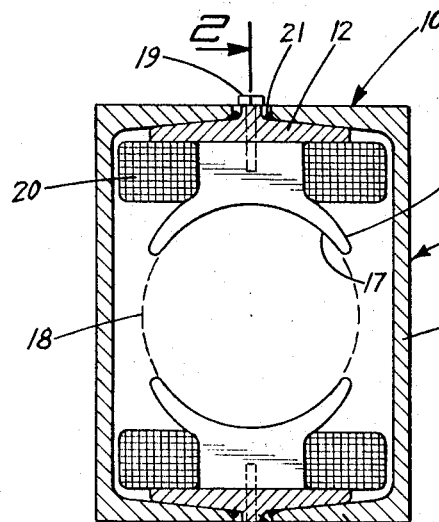
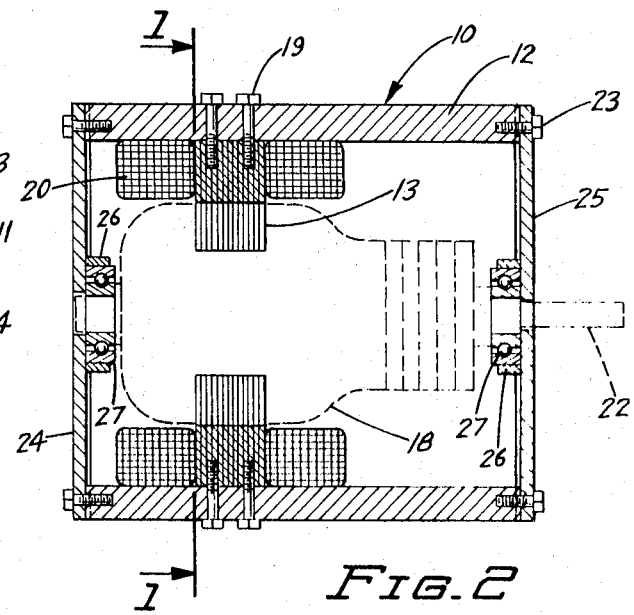
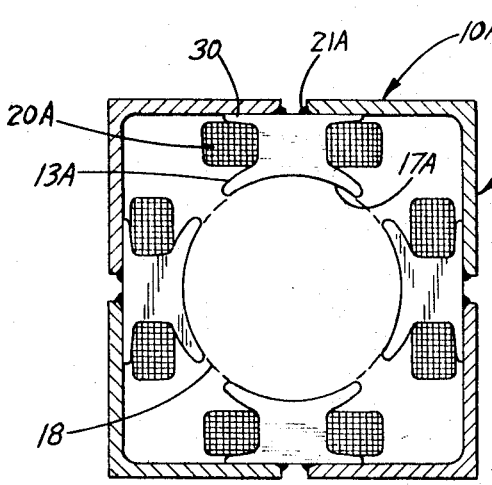
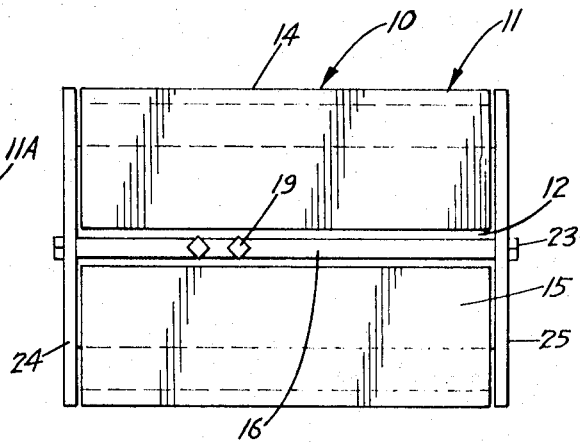
INVENTOR.
LEON R. LEASE
BY
Burd, Braddock & Bartz
ATTORNEYS

3,626,219

INVENTOR.
LEON R. LEASE
BY
*Burd, Braddock & Bartz*
ATTORNEYS

DYNAMO ELECTRIC MACHINE AND METHOD OF MAKING SAME

This invention relates to dynamoelectric machines, generators and motors, and particularly to the mounting of the stator members of such machines within a casing or housing. Great economies in labor and materials are possible from practice of the invention.

In the manufacture of direct current electric motors and generators, it has been customary to construct the field core from a plurality of sheet metal laminations which are assembled in stacked relation and secured together by any suitable means, such as welding. The pole formations are encircled by field windings and the field assembly is enclosed by a casing including end members having bearings for rotatably supporting an armature. It has been suggested to form a rectangular housing from a pair of channel-shaped frame members secured in assembled relation with a pair of pole assemblies and having end caps for supporting the ends of the armature shaft. Because precise disposition of the pole assemblies is essential, according to prior methods of manufacture the casing elements have has to be precisely formed so as to maintain the required relationship between the pole elements.

The principal object of the present invention is to provide a method by which the pole elements may be precisely positioned and the housing formed from readily available structural channel iron members with minimum working of the materials and minimum labor costs, and to provide the resulting dynamoelectric machine structure.

The invention is illustrated in the accompanying drawings in which corresponding parts are identified by the same numerals and in which:

FIG. 1 is an elevational in transverse section of the dynamoelectric machine according to the present invention, the section being taken along the line 1—1 of FIG. 2 and in the direction of the arrows;

FIG. 2 is an elevation in longitudinal section along the line 2—2 of FIG. 1 and in the direction of the arrows;

FIG. 3 is a plan view of the unit of FIGS. 1 and 2;

FIG. 4 is an elevation in transverse section of a modified form of dynamoelectric machine having four-pole assemblies.

Figure 5:
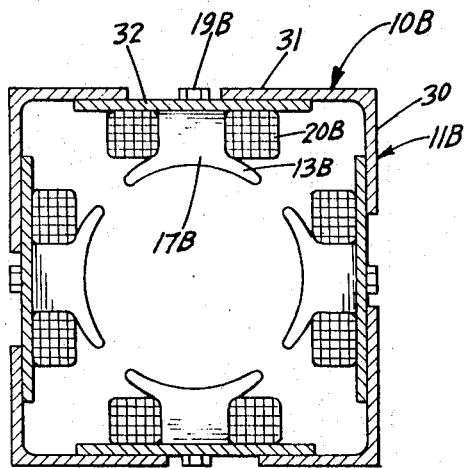
FIGS. 5 through 10 are transverse sections of further modifications.

Referring to the drawings and particularly to FIGS. 1, 2 and 3, there is shown a dynamoelectric machine, indicated generally at 10, including a housing or casing of substantially rectangular configuration. The housing frame is open-ended and is formed from a pair of segments 11 of structural channel iron disposed in face-to-face relation and secured, as by welding, riveting, bolting, etc., to a pair of longitudinally extending parallel spaced-apart plate members 12, each supporting one of a pair of pole assemblies 13. Each channel iron member 11 is composed of a flat base element 14 and a pair of generally parallel projecting side members 15 extending in the same direction at substantially right angles to the base. The inside surfaces of the side members 15 taper from narrower at their free edges to wider at their point of junction with the base 14. The channel members 11 are disposed in parallel face-to-face relation with the side members 15 of one segment of channel iron extending toward the side members 15 of the complementary segment of channel iron comprising the housing.

The longitudinally extending plate members 12 are of substantial width but less than the distance between the bases 14 of the facing channel iron members 11. In length, the plates 12 are just slightly longer than the length of the channel iron members 11, such as about one-sixteenth to one-eighteenth inch, so that in the assembled units the plates 12 extend by about one thirty-second to one-sixteenth inch beyond the ends of each channel member 11. As shown, each plate 12 has a longitudinal rib 16 centrally disposed along the outer surface of the plate. Each plate 12 tapers outwardly from its center portion along the rib to the parallel edges at an angle complementary to the slope of the sides members 15 of the structural channel iron members 11. Dissected I-beams of appropriate size provide a readily available source for plates 12. The inside surface of each plate 12 should be smooth and even, as by grinding or milling.

The pole assemblies 13 are of identical construction and include a pole shoe formation 17 of arcuate shape conforming to the periphery of the armature 18, which is of conventional construction and is shown in broken lines. The pole assemblies may be of unitary construction or, as illustrated, they may be formed from a plurality of identical laminations secured together, as by welding. Each pole assembly 13 is rigidly secured, as by means of screws 19, to the flat inner surfaces of the plates 12, the pole assemblies being in transverse alignment. The body portion of each pole assembly is encircled by a field coil 20 of conventional construction.

In assembling the housing shell, the pole assemblies 13 and windings 20 and their respective plates 12 are mounted in an appropriate jig so as to maintain the pole assemblies in proper spatial relationship and alignment. With the pole assemblies and supporting plates so held in fixed position, the housing side members formed from the structural iron channels 11 are wedged in face-to-face spaced-apart parallel relationship, the inner sloping faces of the side members 15 of the channel members engaging the complementary sloping outside surfaces of the plates 12.

Structural channel iron and structural I-beams are formed by extruding. While generally uniform, such members are not precision made (i.e., imprecisely formed) and may vary to some considerable extend from one member to the next made in the same plant at about the same time, and even from one portion of the same member to another. While the pole assemblies and plates are maintained in fixed relationship to one another, the channel members are wedged as tightly as possible and permanently secured, as by longitudinal welds 21 in the longitudinal grooves formed between the rib 16 of plate 12 and the ends of side members 15 of the structural iron channels 11. This results in a rigid structure in which the relationship of the pole assemblies is precisely determined and fixed. Any nonuniformity in the members is compensated for by the tightly wedged sloping surfaces. While there may be some slight nonuniformity in the exterior dimensions of similar devices made at the same time, this has no effect upon the use and operation of the devices.

As seen in FIGS. 2 and 3, on a somewhat exaggerated scale, in the assembly of these components the plates 12, which are very slightly longer than channel members 11, extend a small distance beyond the ends of the channel members. This permits precise positioning of the shaft 22 of armature 18 in spite of slight variations in the structure of the channel members 11. The plates 12 are of equal length and their opposite ends are made flat and smooth. Each is tapped at about its midpoint to receive a screw 23 for securing of end plates 24 and 25 precisely to the frame of the housing. Alternatively, the ends of the channel members may be precisely machined to length.

Each end plate includes means for journaling the shaft 22 of the armature 18, as by means of ring 26 welded or otherwise secured centrally of the inside surface of the end plate and serving as a retainer for a bearing 27. In this manner the armature rotor may be precisely mounted in the housing relative to the pole assemblies. The armature is of conventional construction having cummutator or rings and assembled in the usual manner with brushes in brush holders connected to suitable conductor wires or cables and the brushes in rotary engagement with the rings.

Referring now to FIG. 4, there is shown a modified form of dynamoelectric machine, indicated generally at 10A, and having a housing or casing of substantially rectangular configuration formed from four segments 11A of structural angle iron. The housing encloses two pairs of pole assemblies 13A which are of identical construction, either composed of a plurality of laminations or of unitary one-piece construction, as desired. Each pole assembly 13A includes a pole shoe formation 17A of arcuate shape conforming to the periphery of the armature 18, which likewise is of a conventional construction and is shown in broken lines. Each pole assembly desirably includes a pair of flanges 30 opposite from the pole shoe formation 17A. The conventional field coil windings 20A are disposed about the bodies of the pole assemblies in the ordinary manner. The outer surfaces of flanges 30 are relatively flat and smooth.

In the assembly of this modified form of dynamoelectric machine, the two pairs of pole assemblies are mounted in a suitable jig in which they are positioned with the required precise spatial relationship and alignment. Then segments of the angle-iron members 11A are disposed with the inside surfaces of the end edges of the angle-iron members wedged against the outer surfaces of the pole assemblies 13A, each angle-iron segment engaging two adjacent pole assemblies. While the pole assemblies are maintained in fixed relationship to one another and the angle-iron members are fitted as tightly as possible against adjacent pole assemblies, the members are permanently secured, as by longitudinal welds 21A in the longitudinal grooves formed between the flanges 30 of the pole assemblies and the edges of the angle irons 11A.

As in the case of the two-pole assembly, this results in a rigid structure in which the relationship of the pole assemblies is precisely fixed and any nonuniformity in the angle-iron members is compensated for the the manner in which the members are secured to the precisely positioned pole assemblies. End plates are attached to journal the armature in the housing. Depending upon the relative lengths of the angle-iron segments 11A and the pole assemblies 13A, it may be desired that the pole assemblies first be secured to flat longitudinally extending plates, in which event the angle-iron members are welded to the outer surfaces of those plates instead of directly to the pole assemblies.

By the practice of the present invention, precision metalworking operations have been reduced to a minimum with resultant savings in labor and skilled labor costs. Material costs have been reduced through the use of relatively inexpensive and readily available structural iron for the housing frame. There is maximum utilization of material with a minimum production of scrap. These results have been accomplished without sacrifice of the required precise positioning of the functional operating components of the dynamoelectric machine.

Further modified forms of housings for dynamoelectric machines utilizing structural iron members, according to the present invention, are shown in FIGS. 5 through 10. Each utilizes either angle structural iron or cold rolled or cold drawn flats. In each instance, the structural iron member is precisely cut as to length. Otherwise, no precision working is required.

Referring now to FIG. 5, there is shown a modified form of dynamoelectric machine, indicated generally at 10B, having a housing or casing of substantially rectangular configuration formed from four segments 11B of structural angle iron whose sides 30 and 31 are of unequal width. The housing encloses two pairs of pole assemblies 13B of identical construction. Each pole assembly 13B includes a pole shoe formation 17B of arcuate shape conforming to the periphery of the armature. Each pole assembly is rigidly secured, as by means of screws 19B, to the flat inner surface of a cold drawn plate 32. The conventional field coil windings 20B are disposed about the bodies of the pole assemblies in the ordinary manner.

The tow pairs of pole assemblies are mounted in a suitable jig in which they are positioned with the required precise spatial relationship and alignment. Then, segments of the angle iron members 11B are disposed with the inside surfaces of the end edges of the angle-iron members wedged against the outer surfaces of the flat plates 32. The angle-iron segments are disposed in series around the periphery of the housing with longer sides 31 alternating with shorter sides 30. Each angle-iron segment engages two plates 32. While the pole assemblies are maintained in fixed relationship to one another and the angle-iron members are fitted as tightly as possible against adjacent flat plates 32, the members are permanently secured, as by longitudinal welds or other fastening means. Although the angle-iron segments are shown as having unequal side members, the same form of construction may be utilized with angle irons whose side members are of equal width.

Figure 6:
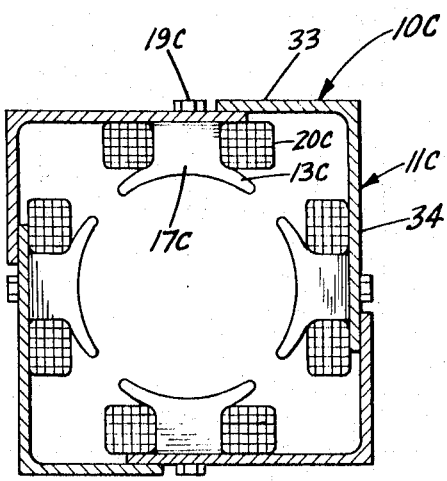

In this form of construction, along with that of FIG. 4 and 6, the diametrically opposite angle-iron segments are preferably in precise alignment so that their end surfaces lie in a common plane and displaced slightly, as by about one thirty-second to one-sixteenth inch, relative to the intervening pair of diametrically opposite angle-iron segments whose opposite ends lie in a common plane. Then, the housing end plates at one end of the housing are mounted on the ends of the angle-iron segments which project slightly from that end and the end plate at the opposite end of the housing is secured to the other angle-iron segments which project slightly at the opposite end.

In FIG. 6, there is shown a slightly modified form of dynamoelectric machine, indicated generally at 10C, having a housing or casing of substantially rectangular configuration formed from four segments 11C of structural angle iron having side members 33 and 34 of unequal width, side 34 being the wider. The housing enclosed two pairs of pole assemblies 13C which are of identical construction, each including a pole shoe formation 17C of arcuate shape conforming to the periphery of the armature. Each pole assembly is rigidly secured, as by means of screws 19C, to the flat inner surface of the wider member 34 of the structural angle-iron segment 11C. The pole assembly is precisely located relative to the other side member 33 extending at right angles to the first and extending generally parallel to the axis of the screws 19C. The body portion of each pole assembly is encircled by a field coil 20C of conventional construction.

In assembling the housing shell, the pole assemblies 13C are mounted in an appropriate jig so as to maintain the pole assemblies in proper spatial relationship and alignment. With the pole assemblies so held in fixed position, the narrower members 33 of each angle-iron segment 11C overlap the wider side member 34 of the next adjacent angle-iron segment. These members are then secured together as by welding or the like.

Figure 7:
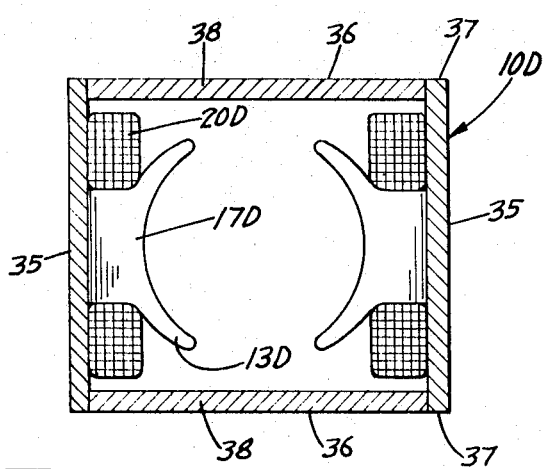

In FIG. 7, there is shown a further modified form of dynamoelectric machine, indicated generally at 10D, and having a housing or casing of substantially rectangular configuration formed from four segments of cold drawn flat stock of appropriate width. Stock sizes of cold drawn steel are made to such close commercial tolerances that no grinding or milling is required. Segments 35 are precisely sawed to length at the ends 37. The length of the housing is the stock width of the cold drawn flats. The end faces 38 of segments 36 are precisely sawed to about the same length as the stock width of the cold drawn flat or just slightly less.

The housing 10D encloses a pair of pole assemblies 13D whose arcuate shoe formations 17D conform to the periphery of an armature. The pole assemblies are secured to the structural segments 35 in any appropriate manner. The conventional field coil windings 20D are disposed about the bodies of the pole assemblies.

In assembling this form of dynamoelectric machine, the pole assemblies are mounted in a suitable jig with the required precise spatial relationship and alignment. The housing segments are assembled with the inside edges of segments 35 butting against the drawn edges of segments 36 and secured, as by welding, into a rigid structure. The end members are mounted in engagement with the edges of segments 35.

Figure 8:
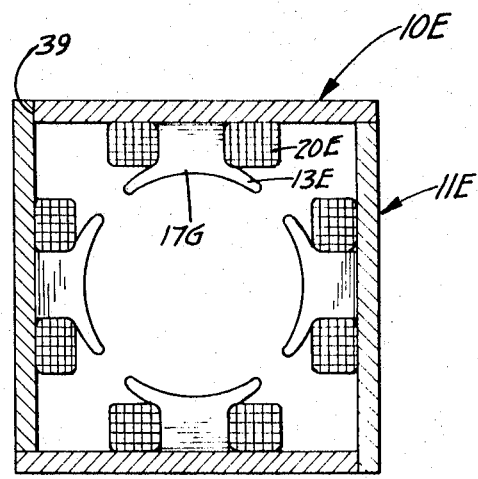

In FIG. 8, there is shown another modified form of dynamoelectric machine, indicated generally at 10E, and having a housing or casing of substantially rectangular configuration formed from four segments 11E of cold drawn flat stock. The housing encloses two pairs of pole assemblies 13E which are of identical construction with a pole shoe 17E of arcuate shape conforming to the periphery of an armature and fitted with the conventional field coil windings 20E. Each pole assembly is secured by any appropriate means to the inside surface of one of the segments 11E, slightly off center and precisely spaced from one end 39, which is preferably precisely sawed, the longitudinal dimension of the housing being the stock width of the structural material. This unit is assembled by mounting the pole assemblies as before with the result that the ends 39 of segments 11E each butt against one edge of the next adjacent segment 11E. With the segments so positioned, they are secured together, as by welding, into a rigid structure. Desirably the two faces of opposite segments 11E lie in a plane at one end of the housing displaced longitudinally slightly from the ends of the other opposite segments whose opposite ends similarly lie in a plane. The end assemblies are mounted on those pairs of segments which extend slightly beyond the intervening segments.

Figure 9:
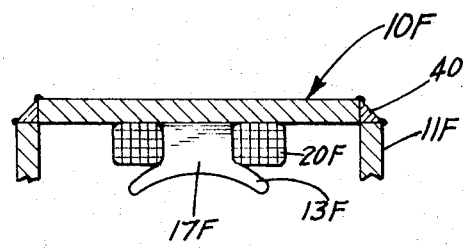

In FIG. 9, there is shown a fragmentary view of a dynamoelectric machine whose housing 10F is formed from segments 11F of cold drawn flat stock of preselected width. Pole assemblies 13F with arcuate pole shoes 17F and field coil windings 20F are mounted centrally along the longitudinal axis on the inside surface of the structural iron segment. With the pole assemblies in fixed position, the widths of the structural segments 11F are such that the edges of adjacent segments just touch or nearly so and an external fillet 40 is fitted into the space between adjacent segments 11F and welded or similarly secured to form a rigid housing structure.

Figure 10:
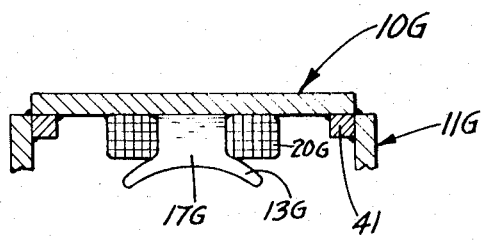

In FIG. 10, there is shown a similar dynamoelectric machine 10G formed from segments 11G of cold rolled flat stock carrying pole assemblies 13G with their windings 20G and similarly assembled. In this instance, the fillet 41 is internal of the housing and is welded or similarly secured to form a rigid housing structure. The fillets 40 and 41 may of course be a variety of cross-sectional shapes so long as two adjacent edges are at right angles.

In each of the forms of dynamoelectric machine illustrated and described, a permanent magnet pole assembly may be substituted for each of the pole assemblies including field coil windings without other change of structure. Such a permanent magnet dynamoelectric machine is described and illustrated in Crawshaw et al. U.S. Pat. No. 3,445,693 issued May 20, 1969.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A dynamoelectric machine comprising:
   A. a plurality of precisely positioned pole assemblies;
   B. an open-ended housing frame, said frame being comprised of:
      1. a plurality of imprecisely formed structural iron members disposed to define a space to receive said pole assemblies and an armature;
      2. said structural iron members on opposite sides of the frame being generally parallel to one another and extending longitudinally of the axis of the machine;
      3. one pole assembly being rigidly secured to each of at least two of said structural iron members;
      4. said imprecisely formed structural iron members being positioned in wedged relation rigidly secured together with said pole assemblies in a generally rectangular frame maintaining the precise positioning of said pole assemblies; and
   C. end plates over the open ends of said housing frame journaling an armature for rotation within said pole assemblies.

2. A dynamoelectric machine according to claim 1 further characterized in that said plurality of structural iron members corresponds in number to the number of said pole assemblies.

3. A dynamoelectric machine according to claim 2 further characterized in that:
   A. said pole assemblies are two in number;
   B. said housing frame is comprised of a pair of structural channel iron members disposed in face-to-face relation and each having a flat base and a pair of generally parallel side members extending in the same direction from the opposite sides of the base;
   C. said channel iron members being secured to said pole assemblies adjacent the free edges of said side members, each of said channel iron members being secured to each of said pole assemblies.

4. A dynamoelectric machine according to claim 3 further characterized in that:
   A. The inside surfaces of the side members of said channel iron members tapering from narrower at their free edges to thicker at their point of junction with the base;
   B. said pole assemblies each include a longitudinally extending plate rigidly secured thereto, said plates being of substantially the same length as said channel iron members;
   C. the outer surface of each of said plates tapers from thicker along its center line to narrower along the parallel edges at an angle complementary to the taper of the side members of the channel iron members; and
   D. said channel iron members and said plates are assembled with the tapered inner faces of the side members of the channel members in engagement with the tapered outer faces of said plates.

5. A dynamoelectric machine according to claim 4 further characterized in that:
   A. the outer surface of said longitudinally extending plate is provided with a central longitudinally extending rib; and
   B. said structural channel iron members and said plates are rigidly secured together by a longitudinal weld in the channel between the free edges of the side members of the channel members and said rib.

6. A dynamoelectric machine according to claim 4 further characterized in that:
   A. said longitudinally extending plates are about one-sixteenth to one-eighth inch longer than said channel members;
   B. the ends of said plates extend about one thirty-second to one-sixteenth inch beyond the ends of said channel members; and
   C. said end plates are secured to the ends of said longitudinally extending plates.

7. A dynamoelectric machine according to claim 2 further characterized in that:
   A. said pole assemblies are four in number;
   B. said housing frame is comprised of four structural angle-iron members, the sides of which are approximately equal in width and disposed at right angles;
   C. said angle-iron members being secured to said pole assemblies adjacent the free edges of said sides, each of said angle-iron members being secured to the two adjacent pole assemblies.

8. A dynamoelectric machine according to claim 2 further characterized in that:
   A. said pole assemblies are four in number;
   B. said housing frame is comprised of four substantially identical structural angle-iron members, the sides of which are unequal in width and disposed at right angles;
   C. said angle-iron members being secured to said pole assemblies adjacent the free edges of said sides, each of said angle-iron members being secured to two adjacent pole assemblies.

9. The method of making a dynamoelectric machine comprising a plurality of precisely positioned pole assemblies; an open ended housing frame, said frame being comprised of a plurality of structural iron members disposed to define a space to receive said pole assemblies and an armature, said structural iron members on opposite sides of the frame being generally parallel to one another and extending longitudinally of the axis of the machine, one pole assembly being rigidly secured to each of at least two of said structural iron members, said structural iron members being rigidly secured together in a generally rectangular frame maintaining the precise positioning of said pole assemblies, and end plates over the open ends of said housing frame journaling an armature for rotation within said pole assemblies, said method comprising the steps of:
- A. precisely and symmetrically positioning a plurality of pole assemblies on a jig;
- b. forming a surrounding housing frame by disposing a plurality of structural iron members around the outer surfaces of said pole assemblies;
- C. rigidly securing one of said pole assemblies to each of at least two of said structural iron members;
- D. rigidly securing together said structural iron members while maintaining said pole assemblies precisely positioned; and
- E. attaching end plates over the open ends of the thusly formed housing frame.

10. A method according to claim 9 further characterized in that said plurality of structural iron members corresponds in number to the number of said pole assemblies.

11. The method according to claim 10 further characterized in that:
- A. said pole assemblies are two in number;
- B. said structural iron members are channel iron members each having a flat base and a pair of substantially parallel side members extending in the same direction from the opposite sides of the base;
- C. said channel iron members are disposed on opposite sides of said pole assemblies in face-to-face relation and wedged into engagement with the pole assemblies; and
- D. said parts are secured by welding.

12. A method according to claim 11 further characterized in that:
- A. the inside surfaces of the side members of said channel members are tapered from narrower at their free edges to thicker at their point of junction with the base;
- B. said pole assemblies each include a longitudinally extending plate rigidly secured thereto, said plates being substantially the same length as said channel iron members;
- C. the outer surface of each of said plates tapers from thicker along its center line to narrower along the parallel edges at an angle complementary to the taper of the side members of the channel iron members; and
- D. said channel iron members and said plates are wedged together by engaging the tapered inner faces of the side members of the channel members with the tapered outer faces of said plates.

13. A method according to claim 9 further characterized in that:
- A. said pole assemblies are two in number;
- B. said housing frame is comprised of a pair of flat parallel structural iron members spaced apart by a second pair of flat spaced-apart parallel structural iron members;
- C. said pole assemblies are rigidly secured to the inside surfaces of one of said pairs of structural members; and
- D. each of said structural members is rigidly secured to each of two adjacent structural members.

14. A method according to claim 10 further characterized in that:
- A. said pole assemblies are four in number;
- B. said housing frame is comprised of a pair of flat parallel structural iron members spaced apart by a second pair of flat spaced-apart parallel structural iron members;
- C. each of said pole members is rigidly secured to the inside surface of one of said structural members; and
- D. each of said structural members is rigidly secured to each of two adjacent structural members.

15. A method according to claim 10 further characterized in that:
- A. said pole assemblies are four in number;
- B. said structural iron members are angle irons, the sides of which are approximately equal in width and disposed at right angles;
- C. said angle irons are disposed spaced between adjacent pole assemblies and wedged into engagement therewith, the inside faces of said angle irons engaging the outer surfaces of said pole assemblies; and
- D. said parts are secured by welding.

16. A method according to claim 10 further characterized in that:
- A. said pole assemblies are four in number;
- B. said structural iron members are substantially identical angle irons, the sides of which are unequal in width and disposed at right angles;
- C. said angle irons are disposed spaced between adjacent pole assemblies and in engagement therewith, the inside faces of said angle irons engaging the outer surfaces of said pole assemblies; and
- D. said parts are secured by welding.

17. A method according to claim 10 further characterized in that:
- A. said pole assemblies are four in number;
- B. said structural iron members are substantially identical angle irons, the sides of which are unequal in width and disposed at right angles;
- C. said angle irons are disposed spaced between adjacent pole assemblies and in engagement therewith, the inside faces of the wider of the sides of said angle irons engaging the outer surfaces of said pole assemblies, the inside faces of the narrower of the sides of said angle irons engaging the outer faces of the wider of the sides of the next adjacent angle iron; and
- D. said parts are secured by welding.

18. A dynamoelectric machine comprising:
- A. a pair of precisely positioned pole assemblies;
- B. an open-ended housing frame, said frame being comprised of:
  1. a pair of flat parallel structural iron members spaced apart by a second pair of flat spaced-apart parallel structural iron members disposed to define a space to receive said pole assemblies and an armature;
  2. said structural iron members extending longitudinally of the axis of the machine;
  3. said pole assemblies being rigidly secured to the inside surfaces of one of said pairs of structural iron members;
  4. each of said structural iron members being rigidly secured to each of two adjacent structural iron members in a generally rectangular frame maintaining the precise positioning of said pole assemblies; and
- C. end plates over the open ends of said housing frame journaling an armature for rotation within said pole assemblies.

19. A dynamoelectric machine comprising:
- A. four precisely positioned pole assemblies;
- B. an open-ended housing frame, said frame being comprised of:
  1. a pair of flat parallel structural iron members spaced apart by a second pair of flat spaced-apart parallel structural iron members disposed to define a space to receive said pole assemblies and an armature;
  2. said structural iron members extending longitudinally of the axis of the machine;
  3. each of said pole assemblies being rigidly secured to the inside surface of one of said structural iron members;
  4. each of said structural iron members being rigidly secured to each of two adjacent structural iron members in a generally rectangular frame maintaining the precise positioning of said pole assemblies; and
- C. end plates over the open ends of said housing frame journaling an armature for rotation within said pole assemblies.

* * * * *

PO-1050
(5/69)

UNITED STATES PATENT OFFICE
CERTIFICATE OF CORRECTION

Patent No. 3,626,219          Dated December 7, 1971

Inventor(s) Leon R. Lease

It is certified that error appears in the above-identified patent and that said Letters Patent are hereby corrected as shown below:

Column 1, line 22, "has" should be --had--.

Column 1, line 33, "elevational" should be --elevation--.

Column 1, line 68, "one-eighteenth" should be --one-eighth--.

Column 1, line 75, "sides" should be --side--.

Column 2, line 29, "extend" should be --extent--.

Column 3, line 25, "the" (first occurrence) should be omitted.

Column 3, line 64, "tow" should be --two--.

Column 4, line 21, "enclosed" should be --encloses--.

Signed and sealed this 2nd day of May 1972.

(SEAL)
Attest:

EDWARD M. FLETCHER, JR.        ROBERT GOTTSCHALK
Attesting Officer               Commissioner of Patents